(12) United States Patent
Zhou

(10) Patent No.: US 10,739,640 B2
(45) Date of Patent: Aug. 11, 2020

(54) LIQUID CRYSTAL DISPLAY COMPRISING A LIGHT GUIDE PLATE WITH A CAVITY HAVING A FLAT BOTTOM SURFACE AND A PLURALITY OF QUANTUM DOTS CONFINED WITHIN THE CAVITY BY SIDEWALLS AND A COVER FILM

(71) Applicant: WUHAN CHINA STAR OPTOELECTRONICS TECHNOLOGY CO., LTD, Wuhan, Hubei (CN)

(72) Inventor: Gege Zhou, Guangdong (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 0 days.

(21) Appl. No.: 16/796,915

(22) Filed: Feb. 20, 2020

(65) Prior Publication Data

US 2020/0192163 A1 Jun. 18, 2020

Related U.S. Application Data

(62) Division of application No. 14/775,798, filed on Sep. 14, 2015, now Pat. No. 10,591,775.

(51) Int. Cl.
| | | |
|---|---|---|
| *G02F 1/13357* | (2006.01) | |
| *F21V 8/00* | (2006.01) | |
| *G02F 1/1335* | (2006.01) | |
| *G02F 1/017* | (2006.01) | |

(52) U.S. Cl.
CPC ....... *G02F 1/133617* (2013.01); *G02B 6/002* (2013.01); *G02B 6/0003* (2013.01); *G02B 6/0035* (2013.01); *G02B 6/0043* (2013.01); *G02B 6/0046* (2013.01); *G02F 1/133553* (2013.01); *G02F 2001/01791* (2013.01)

(58) Field of Classification Search
CPC .... G02B 6/0035; G02B 6/0043; G02B 6/002; G02B 6/004; G02F 2001/01791
See application file for complete search history.

(56) References Cited

U.S. PATENT DOCUMENTS

| | | | | |
|---|---|---|---|---|
| 2003/0048639 A1* | 3/2003 | Boyd | .................... | G02B 6/0031 362/97.3 |
| 2010/0208493 A1* | 8/2010 | Choi | .................... | G02B 6/0035 362/607 |

(Continued)

*Primary Examiner* — Paul C Lee
(74) *Attorney, Agent, or Firm* — Leong C. Lei

(57) ABSTRACT

A light guide plate includes a bottom surface and a light emitting surface disposed opposite to the bottom surface. The light emitting surface sags down and forms a hollow, which is filled with a plurality of light-emitting quantum dots (QDs). The light emitting surface capped with a cover film, so to seal the plurality of light-emitting QDs in the hollow. Also provided are a backlight module including the light guide plate and a liquid crystal display using the backlight module. The hollow that is formed in the top surface of a flat body of the light guide plate and filled with light-emitting QDs helps enhance the color gamut of the display backlight. Further, side walls that surround the hollow can be narrowed so as to easily realize a narrow edge design for the backlight module.

7 Claims, 2 Drawing Sheets

(56) References Cited

U.S. PATENT DOCUMENTS

| | | | |
|---|---|---|---|
| 2012/0274882 A1* | 11/2012 | Jung | G02F 1/133617 |
| | | | 349/96 |
| 2013/0341666 A1* | 12/2013 | Yoshida | H01L 33/501 |
| | | | 257/98 |
| 2014/0036203 A1* | 2/2014 | Guillou | G02B 6/0003 |
| | | | 349/62 |
| 2014/0153286 A1* | 6/2014 | Zhou | G02B 6/0021 |
| | | | 362/613 |
| 2014/0233212 A1* | 8/2014 | Park | G02F 1/133617 |
| | | | 362/84 |

* cited by examiner

— LIQUID CRYSTAL DISPLAY COMPRISING A LIGHT GUIDE PLATE WITH A CAVITY HAVING A FLAT BOTTOM SURFACE AND A PLURALITY OF QUANTUM DOTS CONFINED WITHIN THE CAVITY BY SIDEWALLS AND A COVER FILM

CROSS REFERENCE TO RELATED APPLICATIONS

This is a divisional application of co-pending U.S. patent application Ser. No. 14/775,798, filed on Sep. 14, 2015, which is a national stage of PCT Application No. PCT/CN2015/087630, filed on Aug. 20, 2015, claiming foreign priority of Chinese Patent Application No. 201510221643.3 filed on Apr. 30, 2015.

BACKGROUND OF THE INVENTION

1. Field of the Invention

The present invention relates to a liquid crystal display (LCD) technology, and more specifically, to a light guide plate (LGP), backlight module and LCD.

2. Description of the Prior Art

Nowadays, an LCD, as a display part of electronic appliances, has been applied extensively to a variety of electronic products. As consumers are demanding higher and higher color vividness, the LCD, as the display part of electronic appliances, must enhance its color gamut. The current LCD comprises a liquid crystal panel disposed opposite to a backlight module, providing display backlight to the liquid crystal panel. The color gamut of the LCD is directly determined by the gamut of the light provided to the liquid crystal panels by the backlight module, one of the most important components of the LCD. To enhance the gamut of the light provided by the backlight module, the existing technology usually applies films formed by quantum dots (QDs) to the backlight module.

FIG. 1 is a side view showing a part of a conventional backlight module comprising a QD film. An LGP 10 is disposed in a bezel 20. The top surface of the LGP 10 is layered with a QD film 30, with an optical film 40 on top of the QD film 30. An ineffective zone 50 of QD film is formed around the QD film 30 on the top surface of the LGP 10. A plastic frame 60 is disposed in the bezel 20 and circling around the LGP 10. The optical film 40 is fixed on the plastic frame 60 by a doubled-sided blackout adhesive 70. A reflector 80 is disposed between the bottom surface of the LGP 10 and the bezel 20. The backlight module of FIG. 1 enhanced the color gamut of the display backlight provided by the backlight module by making use of the QD film 30. However, an area of an ineffective zone 50 of the QD film that surrounds the QD film 30 is rather large. It is not instrumental in realizing the design of a narrow edge backlight module.

SUMMARY OF THE INVENTION

To solve the problem with the existing technology, one object of the present invention is to provide an LGP, a backlight module and an LCD that enhance the color gamut of the display backlight and suit the narrow edge design of the backlight module.

According to the present invention, a light guide plate comprises a bottom surface and a light emitting surface disposed opposite to the bottom surface. The light emitting surface sags down and forms a hollow, which is filled with a plurality of light-emitting quantum dots (QDs), with the light emitting surface capped with a cover film, so to seal the plurality of light-emitting QDs in the hollow.

Furthermore, the light guide plate comprises a flat body, and a wedge body extending upward from one end of the flat body. The light emitting surface of the LGP comprises the top surface of the flat body. The bottom surface of the LGP comprises the bottom surface of the flat body and the bottom surface of the wedge body.

Furthermore, the hollow is filled with transparent adhesive, in which the plurality of QDs are evenly distributed.

Furthermore, the refractive index of the transparent adhesive is the same as that of the light guide plate.

Furthermore, the hollow is filled with a plurality of scattering particles that, along with the plurality of light-emitting QDs, are evenly distributed in the transparent adhesive.

Furthermore, the plurality of scattering particles are transparent and have a refractive index different from that of the transparent adhesive.

Furthermore, the transparent adhesive is a UV-curing adhesive.

Furthermore, the cover film is transparent.

According to the present invention, a backlight module comprises a light guide plate as mentioned above.

According to the present invention, a liquid crystal display comprises a backlight module and a liquid crystal display panel facing the backlight module. The backlight module comprises a light guide plate as mentioned above.

The present invention forms a hollow on the top surface (which is a light emitting surface) of a flat body of the LGP. The hollow is filled with a plurality of light-emitting QDs, which can enhance the color gamut of the display backlight. Further, the side walls surrounding the hollow can be narrowed so that it is easier to realize the narrow edge design of the backlight module.

BRIEF DESCRIPTION OF THE DRAWINGS

The accompanying drawings are included to provide a further understanding of the invention, and are incorporated in and constituting a part of this specification. The drawings illustrate embodiments of the invention and, together with the description, serve to explain the principles of the invention.

DETAILED DESCRIPTION OF THE PREFERRED EMBODIMENTS

Figure 1:
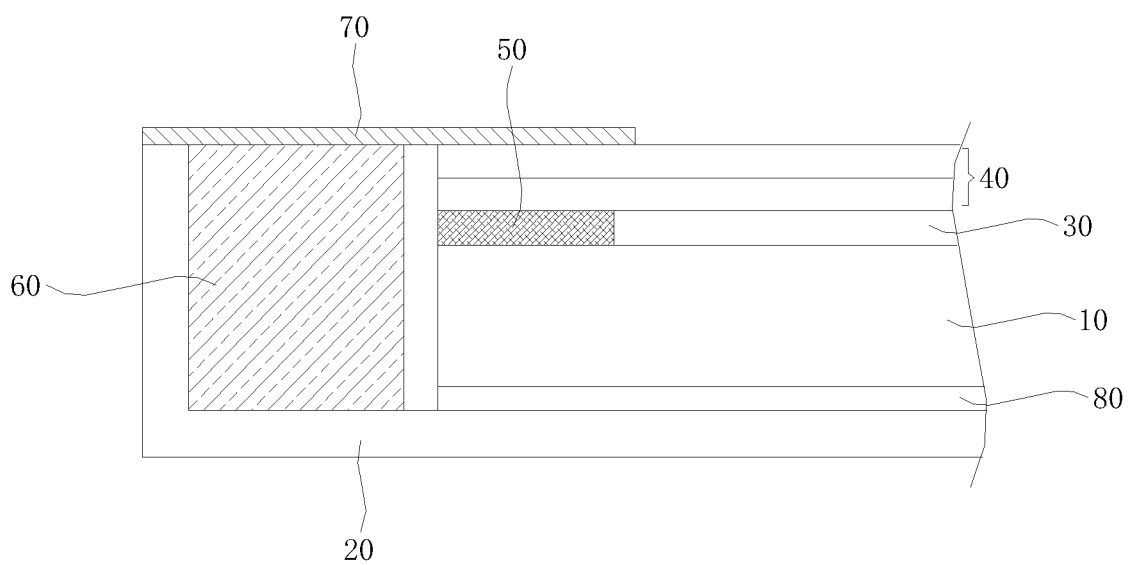
FIG. 1 is a side view showing a part of a conventional backlight module comprising a QD film.

Although the present invention will be explained with reference to the embodiments shown in the drawings described above, it should be understood to the ordinary skilled persons in the art that the invention is not limited to the embodiments, but rather various changes or modifications thereof are possible without departing from the spirit of the invention. Accordingly, the scope of the invention shall be determined only by the appended claims and their equivalents. The appended figures exaggerate the thickness of layers and areas to provide clearer views. The same reference numerals represent the same components throughout the specification and appended figures.

Figure 2:
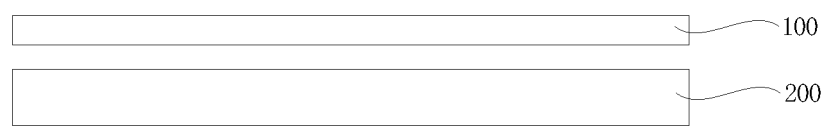
FIG. 2 shows a side view of an LCD according to a preferred embodiment of the present invention.

FIG. 2 shows a side view of an LCD according to a preferred embodiment of the present invention.

Referring to FIG. 2, the LCD of the present invention comprises a liquid crystal panel 100 and backlight module 200, disposed opposite to each other. The backlight module 200 provides display backlight of high color gamut to the liquid crystal panel 100, so that the liquid crystal panel 100 shows images. Because the focus of the present invention is the backlight module 200, the present embodiment does not provide a detailed introduction to the specific structure of the liquid crystal panel 100. One skilled in the art can refer to the structure of liquid crystal panels adopted by the prior art that have been published.

Figure 3:
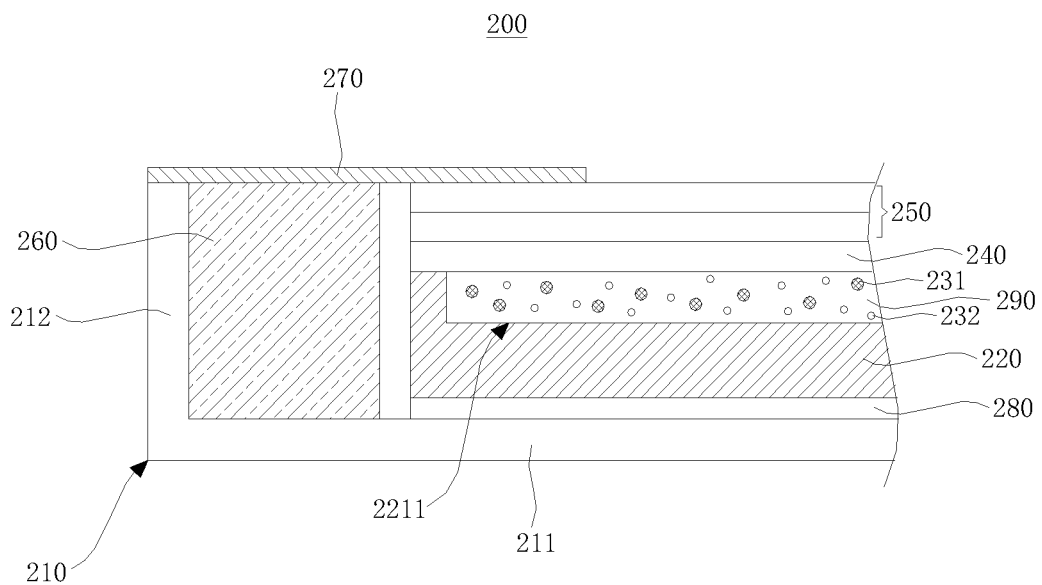
FIG. 3 shows a side view showing a part of a backlight module according to a preferred embodiment of the present invention.
Figure 4:
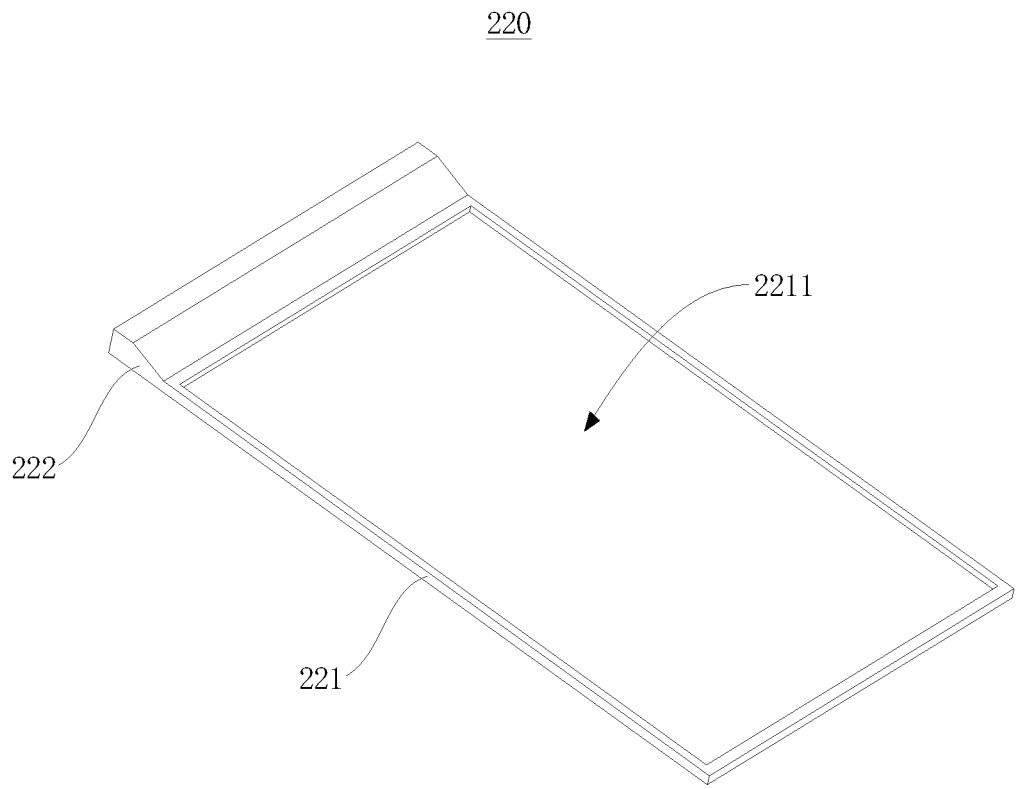
FIG. 4 shows a light guide plate according to a preferred embodiment of the present invention.

A detailed description about the backlight module 200 of the present invention will be provided in the following text. FIG. 3 is a side view of a part of the backlight module according to the preferred embodiment of the present invention. FIG. 4 shows an LGP according to the preferred embodiment of the present invention.

Referring to FIGS. 3 and 4, the backlight module 200 of the present invention comprises a bezel 210, an LGP 220, a plurality of light-emitting QDs 231, a cover film 240, a plurality of optical films 250, a plastic frame 260, doubled-sided blackout adhesive 270 and a reflector 280.

FIG. 3 only shows a bottom plate 211, and a side wall 212 on one side of the bottom plate 211 of the bezel 210. The bezel 210 comprises the bottom plate 211 and four side walls 212, each on one side of the bottom plate 211.

The LGP 220 is disposed on the bottom plate 211 of the bezel 210. In the present embodiment, as shown in FIG. 4, the LGP 220 comprises a flat body 221 and a wedge body 222 that extends upward from one end of the flat body 221. The surface of the thicker end of the wedge body 222 is an incident surface, and the surface of the narrower end of the wedge body 222 connects the flat body 221 smoothly.

In the present embodiment, the bottom surface of the LGP 220 comprises the bottom surfaces of the wedge body 222 and flat body 221. The light emitting surface of the LGP 220 comprises the top surface of the flat body 221. The light emitting surface and the bottom surface of the LGP 220 are disposed opposite each other. The top surface of the flat body 221 sags down, forming a hollow 2211.

A plurality of light-emitting QDs 231 is filled in the hollow 2211. A cover film 240 is capped on the top surface of the flat body 221, so to seal the light-emitting QDs 231 in the hollow 2211. In the present embodiment, the cover film 240 is a transparent film. The light-emitting QDs 231 filled in the hollow 2211 on the top surface of the flat body 221 can enhance the color gamut of the display backlight. Comparing with the ineffective zone 50 of QD film around the QD film 30 of the existing technology, the four side walls surrounding the hollow 2211 can be narrowed so it is easier to realize the narrow edge design of the backlight module 100.

A plurality of optical films 250 is disposed on the cover film 240 one after another. In the present embodiment, these optical films 250 can comprise brightness enhancement films (BEF) and diffuser films, which can improve the quality of the backlight going out from the cover film 240. FIG. 3 shows two optical films 250. However, the present invention is not limited to the two optical films 250 shown in FIG. 3. The plastic frame 260 is installed in the bezel 210 and surrounding the LGP 220. A plurality of optical films 250 is fixed on the plastic frame 260 by the double-sided blackout adhesive 270, therefore fixing the LGP 220 in the bezel 210 at the same time. The reflector 280 is disposed between the LGP 220 and the bottom plate 211 of the bezel 210. The reflector 280 can reflect the light back to the LGP 220, so to enhance light utilization.

The hollow 2211 is filled with transparent adhesive 290. The plurality of light-emitting QDs 231 is distributed evenly in the transparent adhesive 290. Preferably, the transparent adhesive 290 is UV-curing adhesive, but the present invention is not limit to this option. In addition, in the present embodiment, the refractive index of the transparent adhesive 290 is the same as that of the LGP 220.

In order to ensure even diffusion and emission of the light from the backlight source, a plurality of scattering particles 232 is further filled in the hollow 2211. The scattering particles 232 and the plurality of light-emitting QDs 231 are evenly distributed in the transparent adhesive 290. The scattering particles 232 are transparent particles whose refractive index is different from or inconsistent with that of the transparent adhesive.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A liquid crystal display, comprising a backlight module and a liquid crystal display panel facing the backlight module,
   wherein the backlight module comprises a light guide plate, which comprises a flat body and a wedge body extending upward from one end of the flat body, a top surface of the flat body facing toward the liquid crystal display panel,
   wherein the top surface of the flat body sags down and forms a hollow, which is filled with a plurality of light-emitting quantum dots (QDs), the light emitting surface being capped with a cover film, so to seal the plurality of light-emitting QDs in the hollow, and
   wherein the light guide plate comprises a single block of material and the hollow formed in the light emitting surface is in the form of a cavity recessed from a surface of the single block of material and is defined and circumferentially enclosed by sidewalls integrally extending to the surface of the single block of material to support the cover film thereon such that the cover film is in direct contact with the sidewalls of the single block of material, the plurality of light-emitting QDs being confined within the cavity by the sidewalls and the cover film, wherein the cavity that is recessed from the surface of the single block of material has a flat bottom surface that is opposite to a bottom surface of the light guide plate, the bottom surface of the cavity being delimited by the sidewalls, such that the plurality of light-emitting QDs that are confined within the cavity by the sidewalls are deposited on the bottom surface of the cavity and are opposite to a reflector that is arranged between the bottom surface of the light guide plate and a bottom plate of a bezel.

2. The liquid crystal display according to claim 1, wherein the hollow is filled with transparent adhesive, in which the plurality of QDs evenly distributed.

3. The liquid crystal display according to claim 2, wherein the transparent adhesive has a refractive index that is identical to a refractive index of the light guide plate.

4. The liquid crystal display according to claim 3, wherein the hollow is filled with a plurality of scattering particles that, along with the plurality of light-emitting QDs, are evenly distributed in the transparent adhesive.

5. The liquid crystal display according to claim 4, wherein the plurality of scattering particles are transparent and have a refractive index that is different from the refractive index of the transparent adhesive.

6. The liquid crystal display according to claim 2, wherein the transparent adhesive is UV-curing adhesive.

7. The liquid crystal display according to claim 1, wherein the cover film is transparent.

\* \* \* \* \*